Patented Sept. 13, 1949

2,481,810

UNITED STATES PATENT OFFICE 2,481,810

IMPROVING CUT GROWTH RESISTANCE OF BUTADIENE-VINYL PYRIDINE RUBBERY COPOLYMERS

Bernard C. Barton, Clifton, N. J., assignor to United States Rubber Company, New York, N. Y., a corporation of New Jersey No Drawing. Application April 1, 1948, Serial No. 18,497

9 Claims. (Cl. 260—79.5)

This invention relates to butadiene-vinyl pyridine rubbery copolymers and specifically to improving the cut growth resistance of such rubbery copolymers.

Rubber copolymers of butadiene-1,3 and vinyl pyridine are well known materials, having been described in German Patent 695,098 and in U. S. Patent 2,402,020. However vulcanized butadiene-vinyl pyridine copolymers have not exhibited satisfactory cut growth resistance with the result that their suitability for many purposes was greatly impaired.

I have now found that the cut growth resistance of butadiene-vinyl pyridine rubbery copolymers can be greatly enhanced by adding thereto, prior to curing, a small amount of an aromatic sulfonic acid. In some cases as little as 0.1 part by weight of the aromatic sulfonic acid per 100 parts by weight of butadiene-vinyl pyridine copolymer is sufficient to show improvement. However I prefer to employ from 1 to 6 parts by weight of the aromatic sulfonic acid per 100 parts by weight of the butadiene-vinyl pyridine rubbery copoylmer because maximum improvement in cut growth resistance is found within this range. Larger amounts than 6% may be used but are generally unnecessary.

In a typical method of practicing my invention, a vulcanizable mix is prepared containing the butadiene-vinyl pyridine rubbery copolymer and the usual rubber compounding components such as carbon black, zinc oxide, softeners such as pine tar or asphalt or the like, stearic acid, the customary vulcanizing agent, generally sulfur, and vulcanization accelerators. In the formulation of the compound, in accordance with my invention there is incorporated a small amount of the aromatic sulfonic acid. The compounding is usually effected on the regular rubber mill in the usual manner. The resulting compound is then shaped in the usual way and vulcanized in accordance with conventional practice. The resulting vulcanizate exhibits greatly increased cut growth resistance over the same material made without the aromatic sulfonic acid, and none of its other physical properties are impaired. The practice of my invention does not interfere in any respect with the conventional compounding and vulcanizing techinques.

Any aromatic sulfonic acid may be employed in the practice of my invention. While from the standpoints of cheapness and availability, I prefer to employ benzene sulfonic acid, m-benzene disulfonic acid and the naphthalene sulfonic acids, especially alpha-naphthalene sulfonic acid, beta-naphthalene sulfonic acid and naphthalene disulfonic acids, I may employ any other aromatic sulfonic acid. For example, I may employ benzene trisulfonic acid (1,3,5), the various toluene sulfonic acids and xylene sulfonic acids, the various naphthalene trisulfonic acids, the various naphthalene tetrasulfonic acids, etc. The aromatic sulfonic acid employed is generally free from substitution on the ring with any other groups than sulfonic acid groups or alkyl groups. However they may be ring-substituted with groups such as halogen, such as chlorine, amino groups, etc. where such other groups do not cause the resulting compound to exert a harmful effect upon the butadiene-vinyl pyridine rubbery copolymer.

Any butadiene-vinyl pyridine rubbery copolymer may be used in the practice of the present invention. I usually employ a rubbery copolymer of butadiene and 2-vinyl pyridine but the vinyl group may be in any other position on the pyridine, as exemplified by 4-vinyl pyridine. The vinyl pyridine may also be substituted on the pyridine with an alkyl group, as typified by 2-methyl-6-vinyl pyridine. The proportions of butadiene-1,3 and the vinyl pyridine used in making the rubbery copolymer may vary widely as is well known in the art. Usually from 25 to 75% of butadiene and correspondingly from 75 to 25% of the vinyl pyridine are employed. The polymerization of these two monomers is conducted in any manner known to the art, aqueous emulsion polymerization generally being used. The method of making the butadiene-vinyl pyridine rubbery copolymer does not constitute per se any part of the present invention.

The following experiments show the effectiveness of aromatic sulfonic acids in improving cut growth resistance of rubbery butadiene-vinyl pyridine copolymers. Contrary to the well known retarding effect which acids exert on the curing of natural rubber and GR-S (butadiene-styrene rubbery copolymer), the effect which the aromatic sulfonic acids employed in accordance with the present invention exert upon the curing of the vinyl pyridine rubber is either nil or small, as judged by the modulus of the vulcanizate.

The copolymer used in all of the experiments described hereinafter was made from monomers consisting of butadiene-1,3 and 2-vinyl pyridine in a ratio of 75 parts butadiene to 25 parts 2-vinyl pyridine. All parts herein are by weight.

*Examples 1 to 5*

This series of tests compares the effectiveness of m-benzene disulfonic acid with that of acetic acid, oxalic acid, and stearic acid. All of the stocks tested except the one used in Examples 1a and 1b contained acid in the amount indicated added to a portion of the following master batch:

| Ingredients: | Parts by weight |
|---|---|
| Butadiene-vinyl pyridine copolymer | 100 |
| Carbon black | 50 |
| Pine tar | 2 |
| Zinc oxide | 5 |
| Sulfur | 2 |
| Benzylidene bis-dimethyldithiocarbamate | 0.5 |

The stress at 300% elongation and the cut growth resistance were determined on portions of stock containing the various acids cured for 30 minutes and 60 minutes at 45 p. s. i. steam pressure as indicated. As a control, the same tests were made on a portion of the cured master batch containing no added acid (Examples 1a and 1b).

| Example | Acidic Substance Added | Parts by weight of Acid (Per 159.5 Parts of Master Batch) | Cure (Minutes at 45# Steam) | Modulus-Stress at 300% Elongation (p. s. i.) | Cut Growth Resistance (Kilocycles per inch of Growth) |
|---|---|---|---|---|---|
| 1a | None | | 30 | 1,725 | 115 |
| 1b | None | | 60 | 1,730 | 60 |
| 2a | m-Benzene Disulfonic Acid | 3.5 | 30 | 1,425 | 450 |
| 2b | ----do---- | 3.5 | 60 | 1,700 | 1,280 |
| 3a | Acetic Acid | 1.3 | 30 | 1,950 | 60 |
| 3b | ----do---- | 1.3 | 60 | 2,150 | 70 |
| 4a | Oxalic Acid | 2.8 | 30 | 1,875 | 135 |
| 4b | ----do---- | 2.8 | 60 | 2,100 | 80 |
| 5a | Stearic Acid | 6.4 | 30 | 1,450 | 125 |
| 5b | ----do---- | 6.4 | 60 | 1,600 | 130 |

Examples 6 to 8

The following are tests showing the effect of using benzene sulfonic acid and beta-naphthalene sulfonic acid in improving cut growth in accordance with my invention. The same master batch as was used in Examples 1 to 5 was used. With 159.5 parts of this master batch there were incorporated 3 parts of each of these two sulfonic acids. A comparative run containing no acid (Example 6), was vulcanized under the same conditions, namely for 60 minutes at 45 lbs. of steam pressure. The results were as follows:

| Example No | 6 Control | 7 | 8 |
|---|---|---|---|
| | | Sulfonic Acids | |
| Master Batch | 159.5 | 159.5 | 159.5 |
| Benzene Sulfonic Acid | | 3.0 | |
| Beta-Naphthalene Sulfonic Acid | | | 3.0 |
| Stress at 300% Elongation (p.s.i.) | 1,800 | 1,650 | 1,695 |
| Cut Growth Resistance (Kilocycles per inch of growth) | 40 | 295 | 190 |

The variations in stress and in tensile strength of the various materials made as described in the foregoing examples are without any substantial significance. All of the stocks tested were good stocks.

From the foregoing it will be seen that the present invention provides a simple and economical method of overcoming the serious disadvantage of vulcanizates made from rubbery butadiene-vinyl pyridine copolymers, namely their low resistance to cut growth. Incorporation of the aromatic sulfonic acids of the present invention into the mix is carried out readily by standard technique and standard compounding and vulcanizing equipment are employed. The aromatic sulfonic acids do not have any detectable deleterious effect during the compounding and vulcanization or upon the vulcanized product. The aromatic sulfonic acids, especially the monosulfonic acid and disulfonic acids of benzene and naphthalene are comparatively cheap and readily available and therefore do not present any problem of unduly increasing the cost of manufacture of cured butadiene-vinyl pyridine copolymer rubber products.

Having thus described my invention, what I claim and desire to protect by Letters Patent is:

1. As a new composition of matter, cured butadiene-vinyl pyridine rubbery copolymer the cut growth resistance of which is substantially enhanced by curing in the presence of from 1 to 6% by weight based on the weight of said copolymer of an aromatic sulfonic acid admixed therewith.

2. As a new composition of matter, cured butadiene-vinyl pyridine rubbery copolymer the cut growth resistance of which is substantially enhanced by curing in the presence of from 1 to 6% by weight based on the weight of said copolymer of m-benzene disulfonic acid admixed therewith.

3. As a new composition of matter, cured butadiene-vinyl pyridine rubbery copolymer the cut growth resistance of which is substantially enhanced by curing in the presence of from 1 to 6% by weight based on the weight of said copolymer of benzene sulfonic acid admixed therewith.

4. As a new composition of matter, cured butadiene-vinyl pyridine rubbery copolymer the cut growth resistance of which is substantially enhanced by curing in the presence of from 1 to 6% by weight based on the weight of said copolymer of beta-naphthalene sulfonic acid admixed therewith.

5. As a new composition of matter a vulcanizable mixture containing a butadiene-vinyl pyridine rubbery copolymer and from 1 to 6% by weight based on the weight of said copolymer of an aromatic sulfonic acid, said mixture upon vulcanization yielding a vulcanized rubber having a cut growth resistance which is substantially greater than an identical rubber which does not contain said aromatic sulfonic acid.

6. The process of making a vulcanized butadiene-vinyl pyridine copolymer rubber of substantially increased cut growth resistance which comprises forming a vulcanizable mixture containing butadiene-vinyl pyridine rubbery copolymer and from 1 to 6% by weight based on the weight of said copolymer of an aromatic sulfonic acid, and vulcanizing said mixture.

7. The process of claim 6 wherein said acid is m-benzene disulfonic acid.

8. The process of claim 6 wherein said acid is benzene sulfonic acid.

9. The process of claim 6 wherein said acid is beta-naphthalene sulfonic acid.

BERNARD C. BARTON.

No references cited.